United States Patent
Shen

(10) Patent No.: US 7,102,258 B2
(45) Date of Patent: Sep. 5, 2006

(54) MANUAL ELECTRIC GENERATING DEVICE

(76) Inventor: Kun-Tsai Shen, 2F, No. 34, Lane 3, Sec. 4, Tzu Chiang Road, San Chung City, Taipei Hsien (TW)

(*) Notice: Subject to any disclaimer, the term of this patent is extended or adjusted under 35 U.S.C. 154(b) by 207 days.

(21) Appl. No.: 10/809,490

(22) Filed: Mar. 26, 2004

(65) Prior Publication Data

US 2005/0006961 A1    Jan. 13, 2005

(30) Foreign Application Priority Data

Jul. 11, 2003    (TW) .............................. 92212778 U

(51) Int. Cl.
*H02K 7/14*    (2006.01)
*A63B 23/14*    (2006.01)

(52) U.S. Cl. .................. 310/50; 310/156.38; 310/80; 310/73; 310/15; 310/36; 74/5 R; 482/44; 473/594

(58) Field of Classification Search .............. 310/50, 310/47, 73, 15, 36; 290/1 R–1 E; 362/157, 362/192; 482/44; 473/594; 74/5 R
See application file for complete search history.

(56) References Cited

U.S. PATENT DOCUMENTS

| 942,952 | A | * | 12/1909 | Weather .................. 446/235 |
| 1,386,029 | A | * | 8/1921 | Rossiter ..................... 33/324 |
| 1,391,234 | A | * | 9/1921 | Aichele ................ 310/156.38 |
| 1,512,467 | A | * | 10/1924 | Johnson ................... 362/192 |
| 2,066,944 | A | * | 1/1937 | Putnam ..................... 334/62 |
| 2,092,845 | A | * | 9/1937 | Holmes .................... 362/192 |
| 2,666,276 | A | * | 1/1954 | Huff .......................... 446/235 |
| 2,839,934 | A | * | 6/1958 | Shomphe ..................... 74/5.7 |
| 3,017,777 | A | * | 1/1962 | Haeussermann ............ 74/5.46 |
| 3,044,309 | A | * | 7/1962 | Buchhold .................. 74/5.46 |
| 3,056,303 | A | * | 10/1962 | Naylor ...................... 74/5.34 |
| 3,260,475 | A | * | 7/1966 | Ormsby ..................... 244/166 |
| 3,360,703 | A | * | 12/1967 | Reich ........................ 318/128 |
| 3,429,190 | A | * | 2/1969 | Dinter ...................... 74/5.6 R |
| 3,726,146 | A | * | 4/1973 | Mishler ...................... 74/5 R |
| 4,051,401 | A | * | 9/1977 | Hayward ................... 310/216 |
| 4,150,580 | A | * | 4/1979 | Silkebakken et al. ......... 74/5 R |
| 4,727,299 | A | * | 2/1988 | Liu ............................ 318/128 |
| 5,150,625 | A | * | 9/1992 | Mishler ...................... 74/5 R |
| 5,204,570 | A | * | 4/1993 | Gerfast ................... 310/156.38 |
| D351,437 | S | * | 10/1994 | Pravitz ..................... D21/684 |
| 5,353,665 | A | * | 10/1994 | Heebner ....................... 81/3.2 |
| D381,719 | S | * | 7/1997 | Pravitz ..................... D21/684 |
| 5,800,311 | A | * | 9/1998 | Chuang ....................... 482/44 |
| 6,186,914 | B1 | * | 2/2001 | Lin ............................. 473/594 |
| 1,399,598 | A1 | * | 6/2001 | Anderson ................... 362/192 |
| 6,242,827 | B1 | * | 6/2001 | Wolf et al. .................. 310/74 |
| 6,623,405 | B1 | * | 9/2003 | Chuang et al. ............... 482/44 |
| 6,770,012 | B1 | * | 8/2004 | Kuo ............................. 482/44 |
| 2004/0124729 | A1 | * | 7/2004 | Long ..................... 310/156.38 |

FOREIGN PATENT DOCUMENTS

JP    2003018811 A    * 1/2003

* cited by examiner

*Primary Examiner*—Darren Schuberg
*Assistant Examiner*—Yahveh Comas
(74) *Attorney, Agent, or Firm*—Troxell Law Office, PLLC

(57) ABSTRACT

The present invention discloses a manual electric generating device, which comprises an upper casing, a lower casing; a rotor, a fixed stand, a hollow cylinder, a coil for generating power supply; and a printed circuit board for processing and outputting the power supply. The power supply is outputted to a portable electronic device for charging its battery or lighting up its indicating lamp.

13 Claims, 6 Drawing Sheets

MANUAL ELECTRIC GENERATING DEVICE

FIELD OF THE INVENTION

The present invention relates to a manual electric generating device, more particularly to a manual electric generating device having a wrist exercising effect, in addition to the effect of supplying power to charge an electronic device or use its indicating lamp.

BACKGROUND OF THE INVENTION

Please first refer to FIG. 6 for the diagram of the Taiwanese Utility Model Application No. 86212568 entitled "Improved twist trainer". In FIG. 6, an improved twist trainer 70 comprises a spherical hollow shell 73 comprised of a base 71 and an upper casing 72, a counter 80, a horizontal ring 74 disposed inside the hollow shell 73, and a rotor 75; characterized in that the counter 80 is disposed at the bottom of the base 71, and the horizontal ring 74 is disposed and rotated freely inside the spherical hollow shell 73, and the rotor 75 pivotally coupled to the horizontal ring 74 by a horizontal axle, and a circular groove 76 disposed on the rotor 75 and having a plurality of luminescent members 77 and a magnet 78 and passing through a sensor switch of the counter 80 when the rotor 75 rotates. An electric generator having a permanent magnet and a coil (not shown in the figure) is located between the horizontal ring 74 and the rotor 75 for supplying electric power for the luminescent members. Therefore, a pulling string 90 can be pulled to start the rotor 75 for its continuous rotation inside the shell 73, and the rotational force is used for training the wrist of the user, and also lighting up the luminescent members on the rotor 75 during its operation. In the meantime, the counter 80 senses and displays the number of rotations of the rotor 75.

Further, an additional Taiwanese Utility Model Application No. 86212568A01 entitled "Improved twist trainer" disclosed an improved wrist trainer, characterized in that the rotor comprises a plurality of conical ends protruded from the rotor itself, and the conical ends are disposed equidistantly with each other around the axis and the electric generating device to constitute fan vanes, so that when the rotor rotates, each conical end surrounds the axis and the electric generating device rotates and drives the airflow for heat dispersion. However, the foregoing wrist trainer during its rotation can produce power supply to light up the luminescent members, but it cannot output power supply to other portable electronic devices for their use, which is definitely a deficiency.

SUMMARY OF THE INVENTION

The primary objective of the present invention is to provide a manual electric generating device, more particularly a manual electric device that can provide power to light up a luminescent member and also supply power to charging a portable electronic device or using its indicating lamp, in addition to training the user's wrist.

The manual electric generating device according to the present invention comprises an upper casing of a main body, being a hemisphere and having a hollow cavity at the top of the main body; a lower casing of the main body, being a hemisphere and defining an accommodating space with the upper casing, and having a hollow cavity at the bottom of the lower casing of the main body; a rotor, being disposed in the accommodating space and reciprocally rotating in the accommodating space, and having at least one permanent magnet thereon; a retaining frame, for supporting and mounting the rotor; a coil, being disposed in a hollow cylinder and having a core and a plurality of coiled conductive wires, wherein the conductive wires surround the core, so that when the rotor rotates reciprocally, the permanent magnets divide the coil to generate power supply; a hollow cylinder, being inserted into the cavity and having at least one opening at its external periphery; and a printed circuit board, being coupled to the coil and disposed in the hollow cylinder for processing and outputting power supply; thereby after the assembly, a pulling string is used to start the rotor, and the power supply outputted from the printed circuit board can supply power to charge a portable electronic device or light up its indicating lamp.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
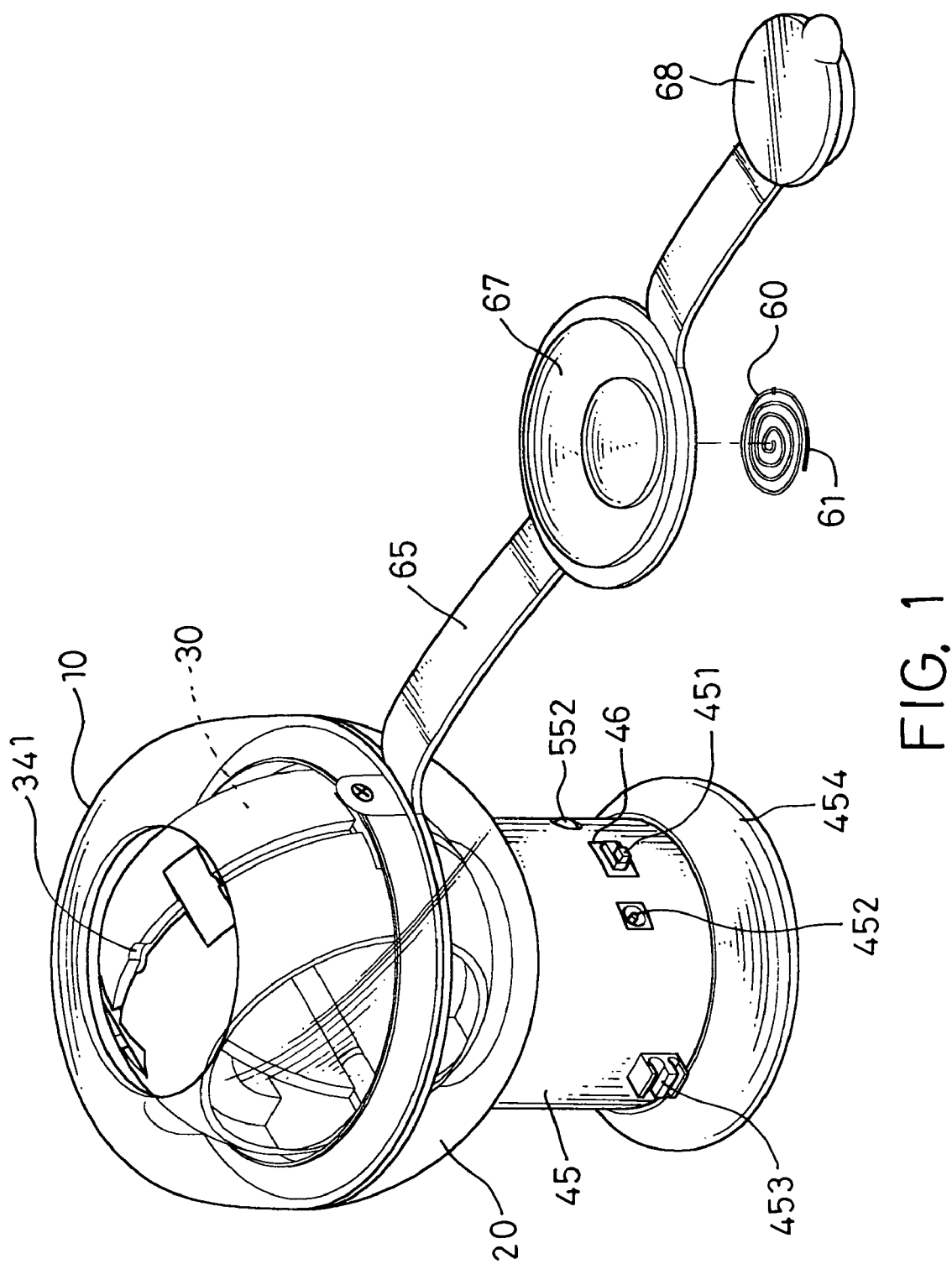
FIG. 1 is a perspective view of the manual electric generating device of the present invention.
Figure 2:
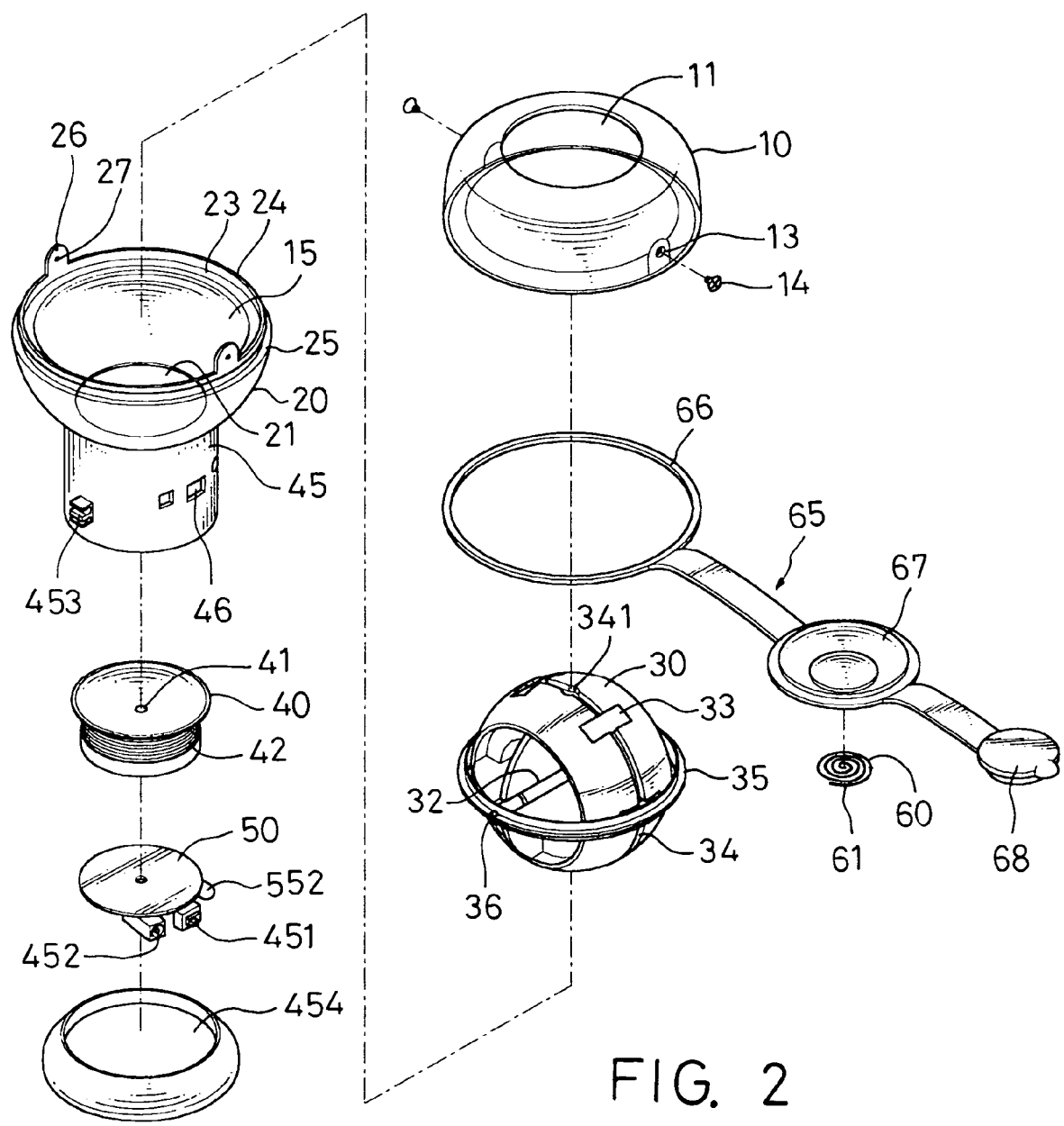
FIG. 2 is an exploded view of the manual electric generating device of the present invention.
Figure 3:
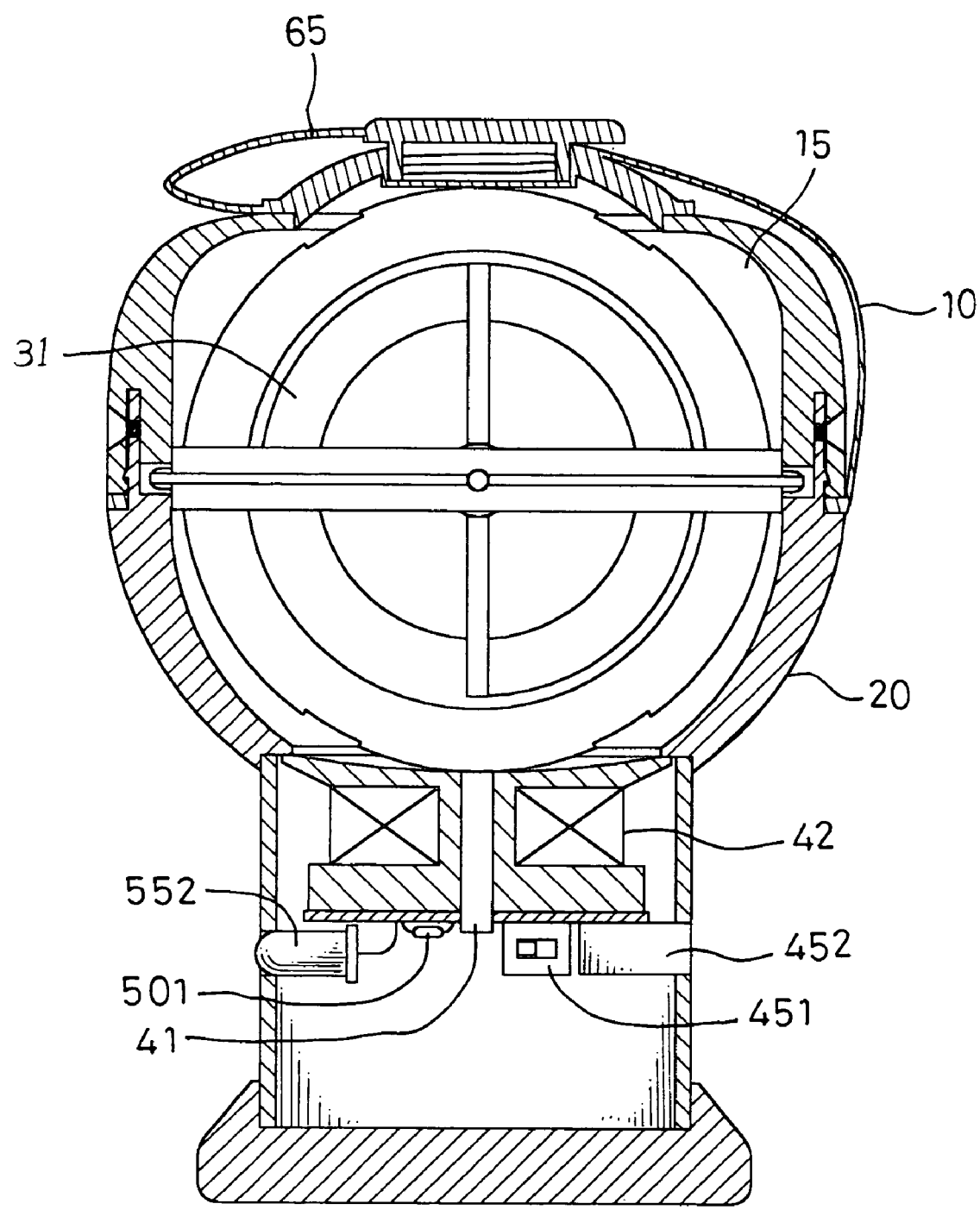
FIG. 3 is a sectional view of the manual electric generating device of the present invention

Please refer to FIGS. 1 to 3 for the perspective view, exploded view, and sectional view of the manual electric generating device 1 in accordance with the present invention respectively. In FIG. 1, the manual electric generating device 1 of the present invention comprises an upper casing 10 of a main body; a lower casing 20 of the main body, a rotor 30, fixed stand 35, a coil 40, a hollow cylinder 45, and a printed circuit 50.

In FIG. 2, the upper casing 10 of the main body according to the present invention is hemispherical in shape, having a hollow cavity 11 disposed at the top of the upper casing 10 of the main body. The lower casing 20 of the main body is also hemispherical in shape, defining an accommodating space 15 together with the upper casing 11 of the main body for accommodating the rotor 30 and having a hollow cavity 21 disposed at the bottom of the lower casing 20 of the main body and a hollow cylinder 45 for being disposed into the hollow cavity 21, wherein at least one opening 46 is disposed at the outer side of the hollow cylinder 45, and an inner circular groove 23, a central protruded ring 24, and an external circular groove 25 are disposed at the top of the lower casing 20 of the main body. In addition, a screw hole 13 is disposed on both ends of the upper casing 10 of the main body, and an ear section 26 is disposed at the corresponding position on both ends of the central protruded ring 24, and a screw hole 27 is disposed on each of the ear sections 26, so that when the upper casing 10 of the main body is coupled with the lower casing 20 of the main body, at least one screw 14 passes through the screw holes 13 and the ear sections 26 to secure the upper casing 10 and the lower casing 20 of the main body.

The rotor 30 is disposed inside the accommodating space 15 and capable of rotating reciprocally in the accommodating space 15, further comprising a weight 31 (as shown in FIG. 3), an axle 32, and at least one permanent magnet 33, wherein the weight 31 is preferably made of zinc alloy; the axle 32 is preferable made of metal; the axle 32 passes through the center of the weight 31. The magnets 33 are disposed equidistantly from each other around the external periphery; the permanent magnets 33 are preferably disposed in an alternate order of anodes and cathodes, and the quantity of permanent magnets 33 is preferably even in number; the weight 31, axle 32, and permanent magnets 33 are made of non-metals and preferably wrapped with a plastic material; a starting groove 34 is disposed at the external periphery of the rotor 30; and at least a starting axle hole 341 is disposed in the starting groove 34.

The fixed stand 35 is used to support and mount the rotor 30, and has a through hole 36 on each end, so that both ends of the axle 32 respectively pass through the through holes 36, and are placed in the internal circular groove 23 to support and mount the rotor 30. The coil 40 disposed in the hollow cylinder 21 has a core 41 and a plurality of conductive wires 42, wherein the conductive wires surrounds the core 41, so that when the rotor 30 rotates reciprocally, the permanent magnets 33 divide the coil 40 to generate power supply, which is preferably an alternate current power supply. The printed circuit board 50 coupled to the coil 40 has at least one electronic component 501 for processing and outputting the power supply, such that when a pulling string 60 is used to start the rotor 30, the power supply outputted from the printed circuit board 50 is supplied to a portable electronic device, such as a mobile phone, a personal digital assistant, or a MP3 player for charging the portable electronic device or lighting up an indicating lamp (as shown in FIG. 3).

The power supply preferably an alternate current power supply outputs a voltage of 5~8V and a current of several hundred of mA for charging a portable electronic device or lighting up an indicating lamp after being stepped down and rectified by the printed circuit board 50. The portable electronic device could be a mobile phone, a personal digital assistant, or a MP3 player, etc, and the indicating lamp 552 could be a high-brightness LED for saving electric power.

Please refer to FIG. 1 again. The hollow cylinder 45 on its external side further comprises a switch 451, a DC socket 452, and a cover 454. The switch 451 and the DC socket 452 are disposed separately at the openings 46 and electrically connected to the printed circuit board 50. Further, the DC socket 452 at one side has a clamping wire groove 453, wherein the switch 451 is used to turn on or off the indicating lamp 552, and the DC socket is used to obtain electric power for charging the portable electronic device, and the clamping wire groove 453 clamps the electric wire of the portable electronic device for holding the electric wire in a fixed position.

Figure 4:
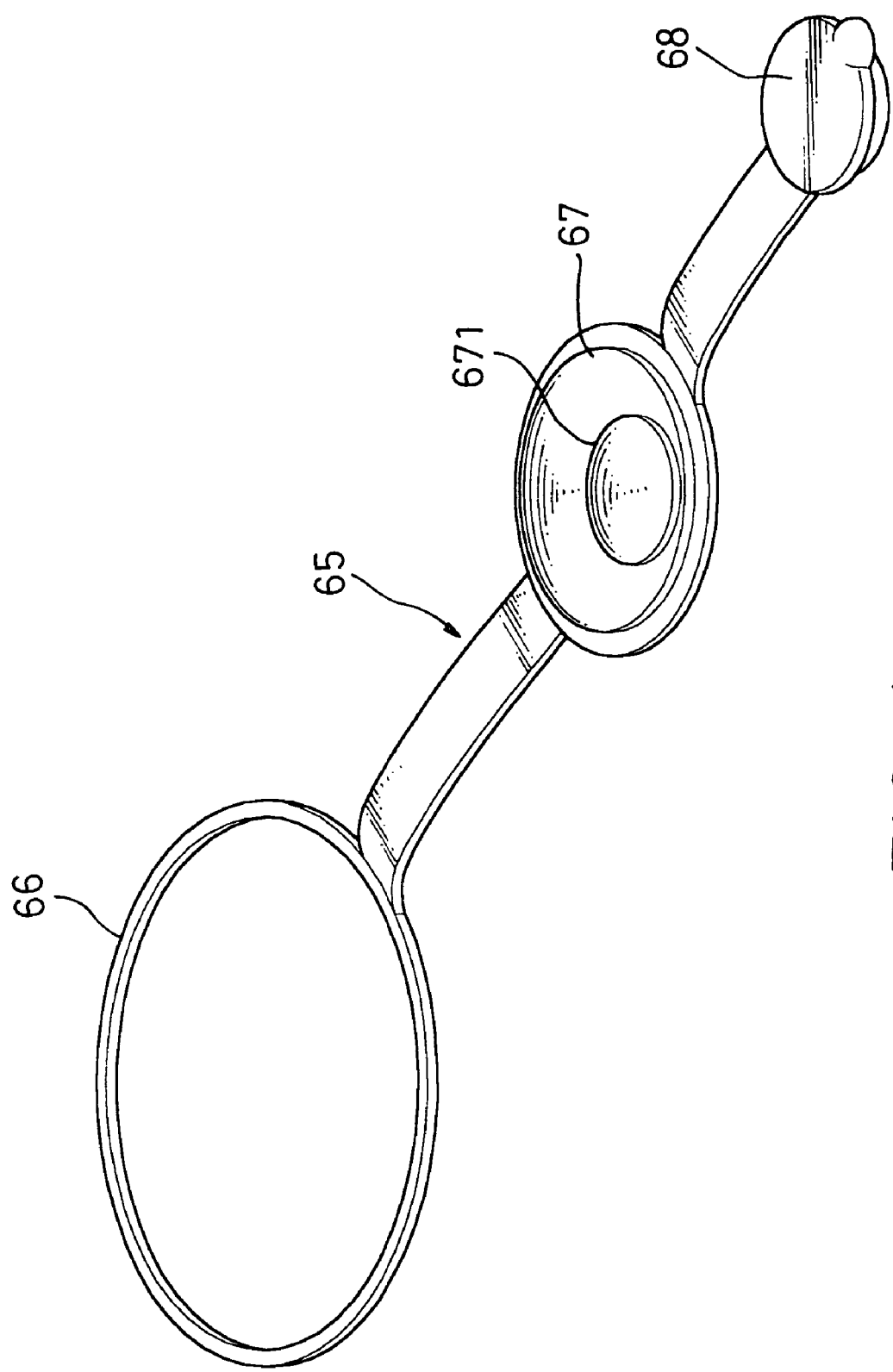
FIG. 4 is a perspective view of the protective cover of the present invention.
Figure 5:
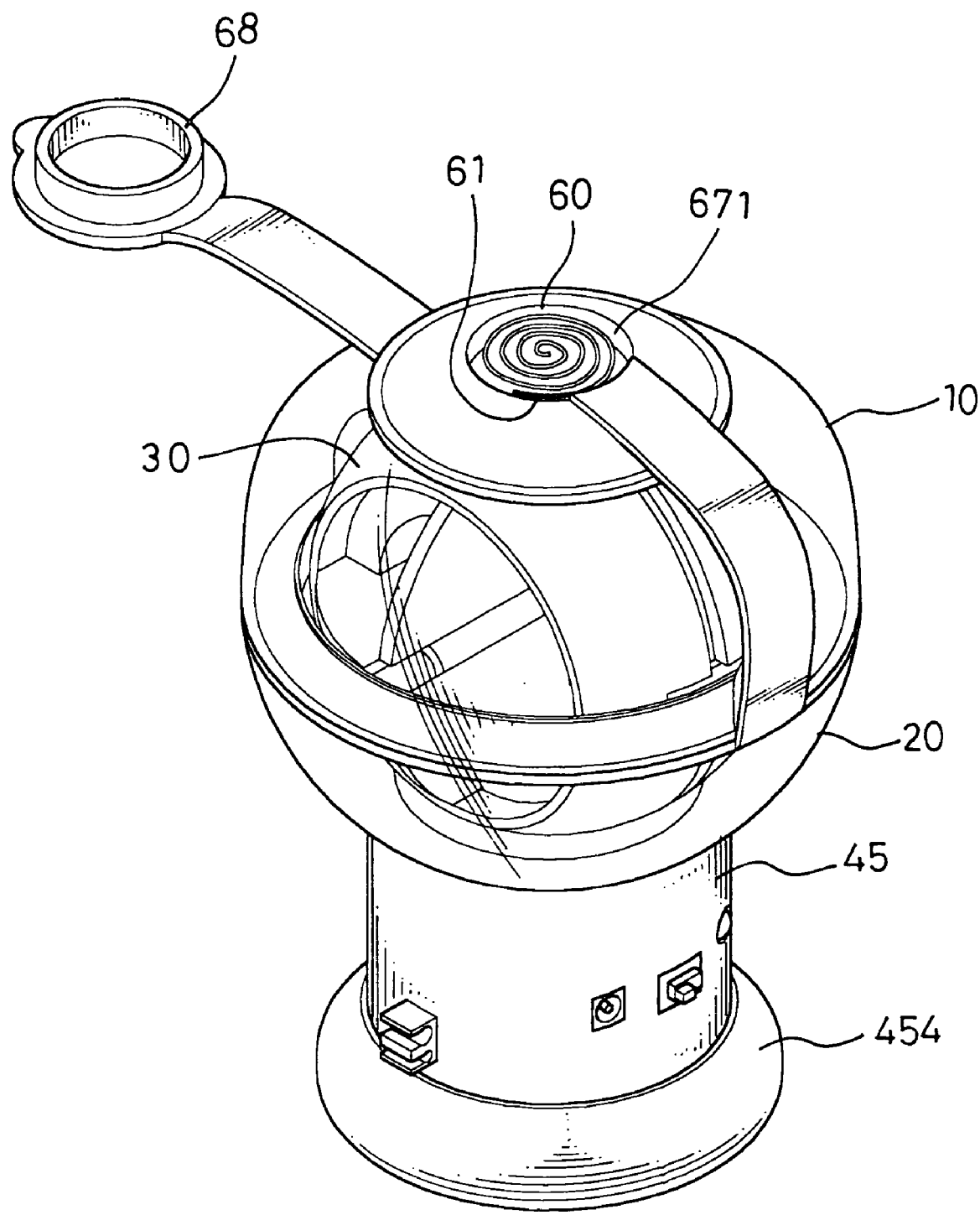
FIG. 5 is a perspective view of the protective cover being combined with the manual electric generating device of the present invention.
Figure 6:
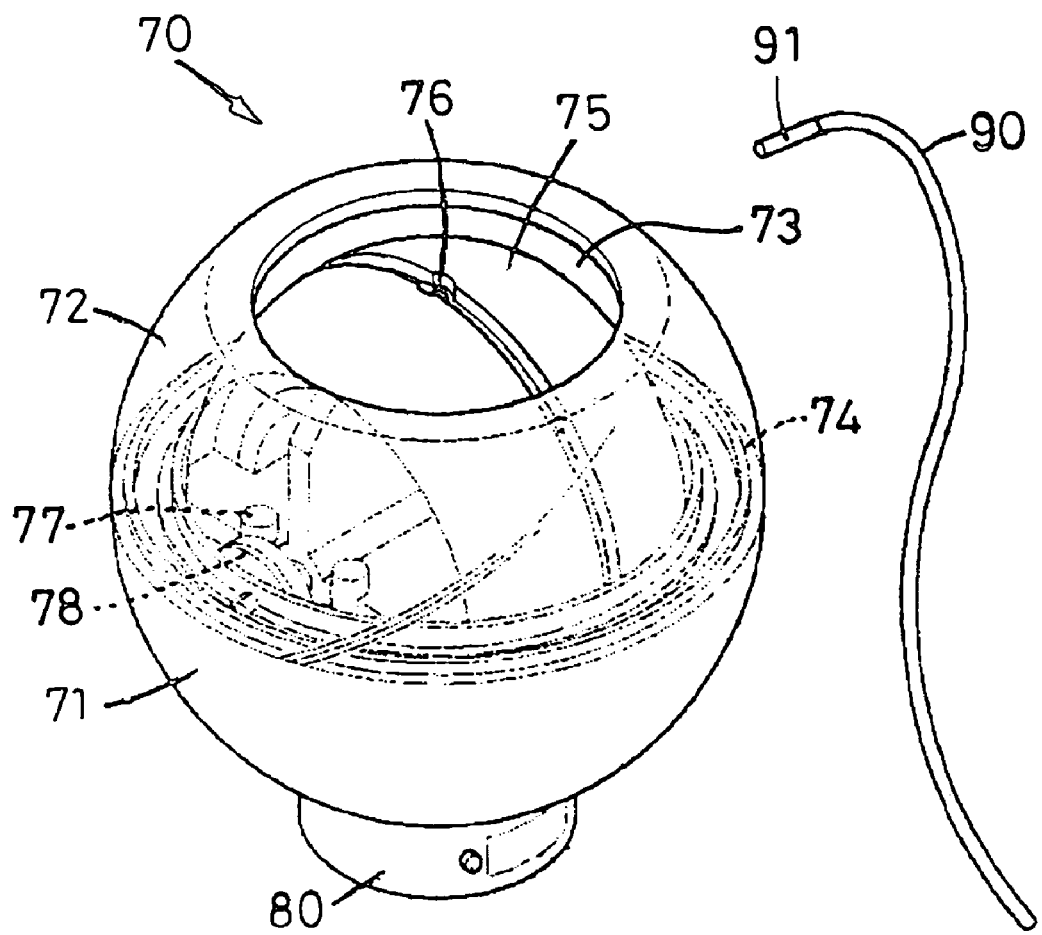
FIG. 6 is a perspective view of a prior-art wrist training device.

Please refer to FIGS. 4 and 5 for the protective cover and the combination of the protective cover with the manual electric generating device of the invention respectively. In the figures, the manual electric generating device further comprises a protective cover 65, preferably made of a rubber material and being installed into the hollow cavity 11 of the upper casing 10 of the main body, for preventing a user's hand from touching the rotor 30 that will slow down or even stop the rotor 30. The protective cover 65 further comprises a holding section 66 with a size precisely fitting into the external circular groove 25 of the lower casing 20 of the main body in order to engage with the upper casing 10 of the main body and attain the holding effect. A wire containing groove 67, being circular in shape and connected to the holding section 66, and having a size precisely fitting into the hollow cavity 11 of the upper casing 10 of the main body; a circular groove 671 for receiving a pulling string 60. A wire groove cover 68, being circular in shape and connected to the wire containing groove 67 and having a size precisely fitting into and covering on the wire containing groove 67 for preventing the pulling string 60 from missing.

The principle for the actions according to the present invention is described as follows. A user holds the manual electric generating device 1 by one hand, and pulls a hard front end 61 of the pulling string 60 and inserts the hard front end 61 into the starting axle hole 341 by the other hand. The sphere 30 is rotated in the hollow cavity 11 by user's fingers, such that the pulling string 60 is coiled into the circular groove 34 of the sphere 30. The pulling string 60 is pulled to rotate the rotor 30, so that the rotational force of the rotor 30 together with an appropriate rotation created by the user's wrist can rotate the rotor 30 continuously. When the permanent magnets 33 on the rotor 30 pass through the coil 40, an alternate current power supply will be generated. After the alternate current power supply is stepped down and rectified by the circuit on the printed circuit board 50 (as shown in FIG. 3), a direct current power supply with a voltage of 5~8V and a current of several hundreds of mA will be outputted from the switch 451 to light up the indicating lamp 552 or the direct current power supply with a voltage of 5~8V and a current of several hundreds of mA is used to charge a portable electronic device. During or after its use, the hollow cavity 11 is covered by the protective cover 65, and the pulling string 60 is coiled into the circular groove 671, and then the wire containing groove 67 is covered by the wire groove cover 68 to prevent the user's hand from touching the rotor 30 which will slow down or stop the rotor 30, and also to prevent the pulling string 60 from missing.

By the implementation of the invention, the manual electric generating device not only can train the user's wrist, but also has the function of generating electric power supply for charging a portable electronic device and lighting up an indicating lamp.

In summation of the above description, the present invention herein enhances the performance than the conventional structure and further complies with the patent application requirements and is submitted to the Patent and Trademark Office for review and granting of the commensurate patent rights.

What is claimed is:

1. A manual electric generating device, comprising an uppercasing, being hemispherical in shape and having a first hollow cavity at its top; a lower casing, being hemispherical in shape and engaged with said upper casing to define an accommodating space, and having a second hollow cavity at the bottom of said lower casing; a rotor, being disposed in said accommodating space and capable of rotating reciprocally in said accommodating space and having at least one permanent magnet thereon; a fixes stand, for supporting and mounting said rotor; a hollow cylinder being inserted into said second hollow cavity and having at least one opening at its external periphery; a coil, being disposed in said hollow cylinder and having a core and a plurality of coiled conductive wires; wherein said conductive wires surround said core, such that when said rotor rotates reciprocally, said permanent magnets divide said coil to generate a power supply; and a printed circuit board, being coupled to said coil and disposed in said hollow cylinder, for processing and outputting said power supply for selectively charging a portable electronic device and lighting up an indicating lamp.

2. The manual electric generating device of claim 1, wherein said lower casing further comprises an inner circular groove, a central protruded ring, and an external circular groove at its top.

3. The manual electric generating device of claim 1, wherein said rotor further comprises a weight, a central axle and at least one permanent magnet, and said central axle passes through the center of said weight and said permanent magnets are disposed equidistantly from each other around the other periphery of said weight, and said weight, said central axle, and said permanent magnets are wrapped with a non-metal material, and a starting groove is disposed at the outer periphery of said rotor, and at least one starting axle hole is disposed in said starting groove.

4. The manual electric generating device of claim 1 wherein said fixed stand comprises a through hole on each end, such that both ends of said central axle pass through said through holes respectively and then are placed inside said circular groove for supporting and mounting said rotor.

5. The manual electric generating device of claim 1, wherein said permanent magnets are preferably even number in quantity and disposed with an alternate order of anodes and cathodes, and its surface is in a circular arc shape.

6. The manual electric generating device of claim 1, wherein said power supply is preferably an alternate current power supply, outputting a direct current power supply with a voltage of 5–8V and a current of several hundred mA after being stepped down and rectified by said printed circuit board for selectively supplying electric power to said portable electronic device and said indicating lamp.

7. The manual electric generating device of claim 1, wherein said portable electronic device is one selected from the collection of a mobile phone, a personal digital assistant, and a MP3 player.

8. The manual electric generating device of claim 1, wherein said indicating lamp is a high-brightness LED.

9. The manual electric generating device of claim 1, wherein said weight is preferably made of a zinc alloy, said central axle is preferably made of a metal, and said non-metal wrap is preferably a plastic injection part.

10. The manual electric generating device of claim 1, wherein said hollow cylinder further comprises a wire clamping groove at its outer side.

11. The manual electric generating device of claim 1, wherein said hollow cylinder at its outer side further comprises a switch, a DC socket, and a cover, and said switch and said DC socket are disposed in said openings and electrically coupled to said printed circuit board for obtaining electric power supply to charge said portable electronic device.

12. The manual electric generating device of claim 1, wherein said upper casing on both ends further comprises a screw hole, and both ends of said central protruded ring comprises an ear section disposed at a position corresponding to said screw hole, and a screw hole is disposed in said ear section, such that when said upper and lower casings are engaged, at least one screw passes through said screw holes to secure said upper and lower casings.

13. The manual electric generating device of claim 2 further comprising a protective cover, being made of a rubber material and inserted into said hollow cavity of said upper casing for preventing a user's hand from touching said rotor to slow down and stop the rotation of said rotor, wherein said protective cover further comprising:

- a holding section, being circular in shape, and having a size precisely fitting said external circular groove of said lower casing to attain the holding effect for engaging said upper and lower casings;
- a wire containing groove, being circular in shape and coupled to said holding section and having a size precisely fitting into said hollow cavity of said upper casing, and a circular groove disposed thereon being used to accommodate said pulling string; and
- a wire groove cover, being circular in shape and coupled to said wire containing groove and having a size precisely inserting and covering said wire containing groove to prevent said pulling string from missing.

* * * * *